US005859871A

United States Patent [19]
Cook

[11] Patent Number: 5,859,871
[45] Date of Patent: Jan. 12, 1999

[54] TRANSMITTING DIGITAL SIGNALS

[75] Inventor: John W. Cook, Suffolk, Great Britain

[73] Assignee: British Telecommunications public limited company, London, England

[21] Appl. No.: 659,531

[22] Filed: Jun. 6, 1996

[30]     Foreign Application Priority Data

Mar. 12, 1996  [EP]   European Pat. Off. .............. 96301671

[51] Int. Cl.⁶ ..................................................... H03H 7/30
[52] U.S. Cl. ........................................... 375/235; 375/340
[58] Field of Search ................................... 375/261, 340, 375/232, 235; 364/724.18, 724.2; 333/18, 28 R

[56]              References Cited

U.S. PATENT DOCUMENTS

| 4,032,762 | 6/1977 | Caloyannides .......................... 375/236 |
| 4,694,413 | 9/1987 | Arbeiter ................................ 364/724.2 |
| 5,027,371 | 6/1991 | Sehier et al. ............................ 375/235 |
| 5,056,117 | 10/1991 | Gitlin et al. ............................... 379/93 |
| 5,095,495 | 3/1992 | Golden ..................................... 375/234 |
| 5,253,271 | 10/1993 | Montgomery ........................... 375/285 |
| 5,425,057 | 6/1995 | Paff ........................................ 375/235 |
| 5,646,957 | 7/1997 | Im et al. ................................... 375/233 |
| 5,694,423 | 12/1997 | Larsson et al. .......................... 375/232 |

FOREIGN PATENT DOCUMENTS

WO 90/06022   5/1990   WIPO .

OTHER PUBLICATIONS

Im et al, "51.84 Mb/s 16–CAP ATM LAN Standard", IEEE Journal on Selected Areas in Communications, vol. 13, No. 4, May 1995, New York, US, pp. 620–632, XP000501258.

Im et al, "Bandwidth–Efficient Digital Transmission Up to 155 Mb/s over Unshielded Twisted Pari Wiring", IEEE International Conference on Communications 1993, 23–26 May 1993, New York, US, pp. 1797–1803, vol. 3, XP000448432.

Zervos, "High–Speed Carrierless Passband Transmission Over the Local Cable Network", IEEE Global Telecommunications Conference 1990, 2–5 Dec. 1990, New York, US, pp. 1188–1195.

Sorbara et al, "Constellation Time Division Multiplexing For the 6Mb/s ADSL", IEEE International Conference on Communications 1994, 1–5 May 1994, New York, US, pp. 821–825, XP000438622.

*Primary Examiner*—Tesfaldet Bocure
*Attorney, Agent, or Firm*—Nixon & Vanderhye P.C.

[57]              ABSTRACT

Carrierless signals of first and second channels pass via filters having quadrature responses and are then added for transmission. A receiver uses adaptive filters which also need quadrature responses to separate the channels effectively. To accommodate misconvergence of the filters giving rise to (a) inverted responses, (b) differential delays, (c) similar or identical responses and/or (d) transposed responses, —and hence incorrect decoding: (a) the transmitter and receiver may employ different coding in each channel, (b) the receiver may calculate the group delay of its filters and correct any error, (c) the receiver may compare the filtered signals and if similar replace one filter response with a quadrature response calculated from the other and/or (d) the receiver may respond to a failure to recognize expected synchronization words by transposing the responses of the filters.

8 Claims, 3 Drawing Sheets

TRANSMITTING DIGITAL SIGNALS

BACKGROUND OF THE INVENTION

The present invention is concerned with carrierless phase and amplitude transmission.

SUMMARY OF THE INVENTION

According to one aspect of the invention there is provided an apparatus for decoding carrierless phase/amplitude modulated signals, comprising a pair of adaptive filters for separating two components thereof and differential decoding means for each component.

In another aspect the invention provides an apparatus for decoding carrierless phase/amplitude modulated signals, comprising a pair of adaptive filters for separating two components thereof, means for comparing the two components and means operable in the event of identity or similarity thereof to (a) calculate from the parameters of one filter of the pair the parameters of a filter having a response orthogonal to that of the one filter; and (b) replace the parameters of the other filter of the pair with the calculated parameters.

In a further aspect of the invention there is provided an apparatus for decoding carrierless phase/amplitude modulated signals, comprising a pair of adaptive filters for separating two components thereof, means for measuring the relative delay introduced by the filters and means for adjusting at least one of the filters so as to reduce the relative delay.

In yet another aspect the invention provides an apparatus for decoding carrierless phase/amplitude modulated signals, comprising a pair of adaptive filters for separating two components thereof, means for detecting the presence of a predetermined signal sequence and means operable in response to absence of such detection to exchange the responses of the two filters.

These expedients may also be employed in combination.

In another aspect the invention provides an apparatus for encoding carrierless phase/amplitude modulated signals comprising means supplying a first and a second sequence of values; means for differential encoding of the first sequence; means for differential encoding of the second sequence; first filter means for filtering the differentially encoded first sequence; second filter means, having a response orthogonal to that of the first filter means, for filtering the differentially encoded second sequence; and means for adding the outputs of the two filter means.

BRIEF DESCRIPTION OF THE DRAWINGS

Some embodiments of the invention will now be described, by way of example, with reference to the accompanying drawings, in which:

FIG. 4 is a block diagram of a filter used in the receiver of FIG. 3.

DETAILED DESCRIPTION OF EXEMPLARY EMBODIMENTS

Figure 1A:
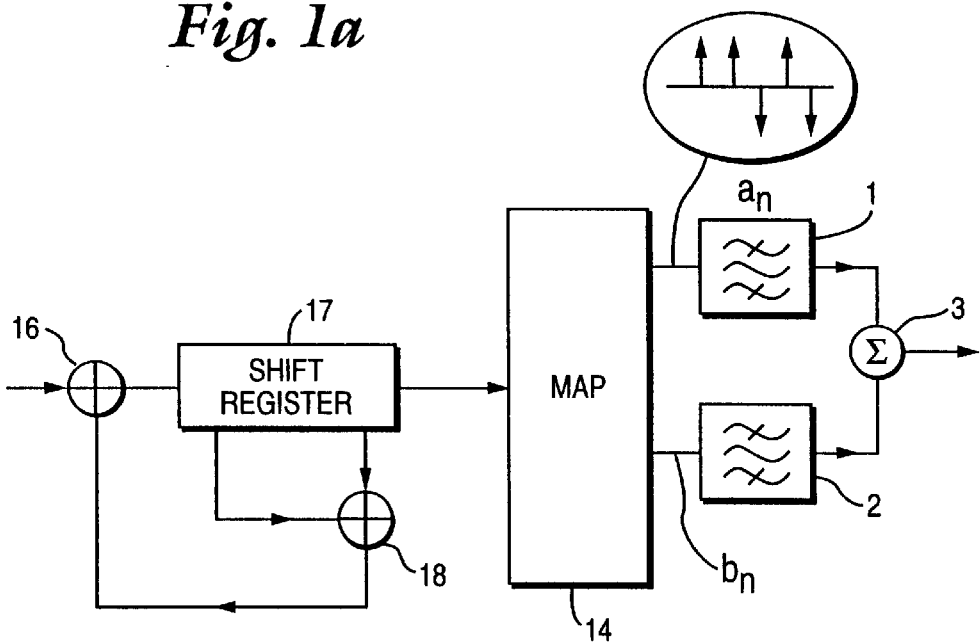
FIGS. 1a and 1b are block diagrams of a transmitter and receiver illustrating carrierless phase and amplitude modulation.
Figure 1B:
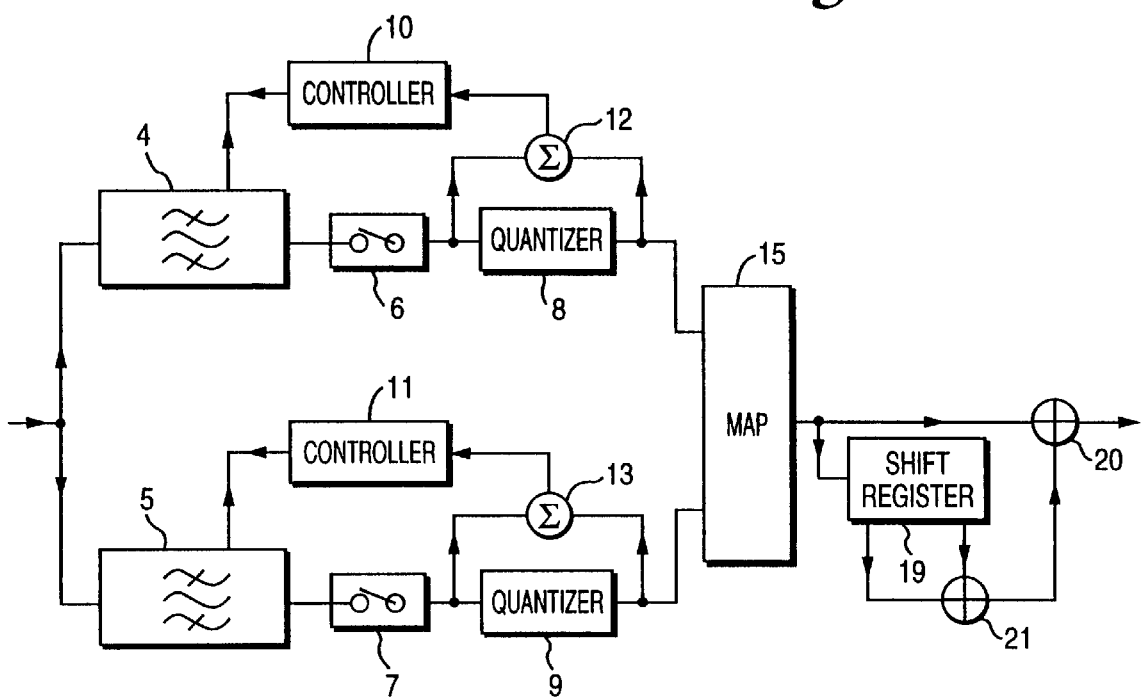

The basic principles of carrierless phase and amplitude transmission are illustrated in FIG. 1. A sequence of discrete values, at intervals T, to be transmitted (signal $a_n$), idealised in the Figure as a series of impulses of +1 and −1 representing binary values 1 and 0 (though multilevel signals are also possible) is fed to a digital shaping filter 1 having an impulse response $g_a(t)$. Another such sequence $b_n$ is fed to a second shaping filter 2 having an impulse response $g_b(t)$, and the outputs of the two filters are added in an adder 3.

At a receiver, the resulting combined signal, received via some signal path, is decoded by a second pair of filters 4, 5, whose outputs are sampled by slicers 6, 7 synchronously with the original impulse period T (by synchronisation arrangements, not shown), followed by decision devices 8, 9 which quantise the signal to the permitted levels (±1 in this example). Each of the filters operates at a sampling rate substantially in excess of 1/T, e.g. 4/T. That the two signal sequences can be separated effectively will be demonstrated as follows.

If at some instant iT the first and second sequences contain an impulse of amplitude $a_i$ and $b_i$ respectively then the outputs of the filters 1, 2 are $a_i \cdot g_a(t-iT)$ and $b_i \cdot g_b(t-iT)$. The general form for the signal s(t) at the output of the adder 3 is:

$$s(t) = \sum_{i=-\infty}^{\infty} (a_i g_a(t - iT) + b_i g_b(t - iT)) \quad (1)$$

Suppose that this signal is received without distortion (or after distortion in transmission and equal and opposite equalisation) and that the receive filters 4, 5 have impulse responses $h_a(t)$ and $h_b(t)$. We can use the convolution integral to calculate the output of each of these receive filters ($r_a(t)$ and $r_b(t)$ respectively) as a function of time. The equation for $r_a$ is given below and that for $r_b$ can be derived similarly:

$$r_a(t) = \int_{-\infty}^{\infty} s(\tau) h_a(t - \tau) d\tau \quad (2)$$

$$r_a(t) = \int_{-\infty}^{\infty} \sum_{i=\infty}^{\infty} (a_i g_a(\tau - iT) + b_i g_b(\tau - iT)) h_a(t - \tau) d\tau$$

$$r_a(t) = \sum_{i=-\infty}^{\infty} \int_{-\infty}^{\infty} ((a_i g_a(\tau - iT) + b_i g_b(\tau - iT)) h_a(t - \tau)) d\tau$$

$$r_a(t) = \sum_{i=-\infty}^{\infty} \int_{-\infty}^{\infty} (a_i g_a(\tau - iT) h_a(t - \tau) + b_i g_b(\tau - iT) h_a(t - \tau)) d\tau$$

At the output of the slicer 6 we need concern ourselves with the value of $r_a$ only at discrete intervals jT:

$$r_a(jT) = \sum_{i=-\infty}^{\infty} \int_{-\infty}^{\infty} (a_i g_a(\tau - iT) h_a(jT - \tau) + b_i g_b(\tau - iT) h_a(jT - \tau)) d\tau \quad (3)$$

If the receive filter response $h_a$ is so chosen that the following relationships are true:

$$\int_{-\infty}^{\infty} (g_a(\tau - iT) h_a(jT - \tau)) \, d\tau \begin{array}{l} = 1 \text{ if } i = j \\ = 0 \text{ if } i \ne j \end{array} \quad (4)$$

$$\int_{-\infty}^{\infty} (g_b(\tau - iT) h_a(jT - \tau)) \, d\tau = 0 \quad (5)$$

Then $r_a(jT) = a_j$.

In a similar way if the receive filter $h_b$ is so chosen that the following relationships are true:

$$\int_{-\infty}^{\infty} (g_a(\tau - iT)h_b(jT - \tau)) \, d\tau = 0 \qquad (6)$$

$$\int_{-\infty}^{\infty} (g_b(\tau - iT)h_b(jT - \tau)) \, d\tau \begin{array}{l} = 1 \text{ if } i = j \\ = 0 \text{ if } i \neq j \end{array} \qquad (7)$$

Then $r_b(jT)=b_j$.

In this way it is possible to determine the original sequences sent without interference between elements of the same sequences or between sequences.

Note that the infinite limits on the integrations are theoretically necessary if any of the impulse responses is infinite, but in practice can be truncated provided that the significant terms of the relevant impulse responses are included.

It is possible to find $h_a$ and $h_b$ with the required properties provided that $g_a$ and $g_b$ are chosen such that $$\int_{-\infty}^{\infty} (g_a(\tau - iT)g_b(\tau))d\tau = 0 \text{ for all } i \qquad (8)$$

This is an extension of the orthogonality property (which would require the truth of this only for i=0).

In this case by substituting $h_a(t) \equiv g_a(-t)$ and $h_b(t) \equiv g_b(-t)$ (i.e. by using filters in the receiver which are matched to the transmit filters) into equations 4,5,6,7 we obtain the reduced requirements of equations 8, 9 and 10:

$$\int_{-\infty}^{\infty} (g_a(\tau - iT)g_a(\tau))d\tau \begin{array}{l} = 1 \text{ if } i = 0 \\ = 0 \text{ if } i \neq 0 \end{array} \qquad (9)$$

$$\int_{-\infty}^{\infty} (g_b(\tau - iT)g_b(\tau))d\tau \begin{array}{l} = 1 \text{ if } i = 0 \\ = 0 \text{ if } i \neq 0 \end{array} \qquad (10)$$

Suitable filters are those forming a Hilbert transform pair (with frequency responses $H(\omega)$ and $jH(\omega)$ where $j^2=-1$).

Systems of this kind are however rather sensitive to channel distortion and noise and it is necessary to use receiver filters 4, 5 having impulse responses $G_a(t)$, $G_b(t)$ which depend not only on the characteristics of the filters 1, 2 but also on the characteristics of the signal path (i.e. they represent the combined effect of the matched responses $g_a(t)$, $g_b(t)$ and the channel equalisation). This can be achieved by using an adaptive filter approach in which a control arrangement 10 (or 11) receives from a subtractor 12 (or 13) the difference between the input and output of the decision device 8 (or 9) and apply an adaptation algorithm such as the Wiener least mean squares algorithm to the relevant filter 4 (or 5) so as to minimise this difference, with the filters 4, 5, converging to the desired responses $G_a(t)$, $G_b(t)$.

A symbol mapper 14 is also shown, which receives binary signals (i.e. 0's and 1's) in bit-serial form, and converts these into the two sequences to be fed to the shaping filters. In its simplest form, this would divert alternate bits to the two channels and translate 0's and 1's into ±1. A reverse mapping occurs in a symbol mapper 15 at the receiver.

Bits for coding are supplied to the symbol mapper 14 via a scrambling arrangement, for example in the form of a self-synchronising pseudo-random sequence generator in which bits are combined serially in an exclusive-or gate 16 with feedback obtained from a 22-bit serial-in parallel-out shift register 17. The feedback is obtained via an exclusive-or gate 18 connected to receive the outputs of the first and 22nd stages of the shift register 17, which takes its input from the output of the exclusive-or gate 16. The function of this scrambling is to decorrelate the signal, to permit satisfactory operation of the adaptive filters at the receiver. A corresponding descrambler is provided at the receiver, with the output of the mapping unit 15 feeding a further serial-in parallel-out shift register 19 and being then combined in an exclusive-or gate 20 with the output of an exclusive-or gate 21 connected to receive the outputs of the 1st and 22nd stages of the shift register 19.

Unfortunately, certain cases of misconvergence of the filters 4 and 5 can arise:

(1) one or both of the filters converges to $-G_a(t)$ or $-G_b(t)$ thereby producing an inverted output;

(2) one or both of the filters may converge to a response which is timeshifted so that the output signal is delayed (or advanced) by a multiple of T.

Figure 2:
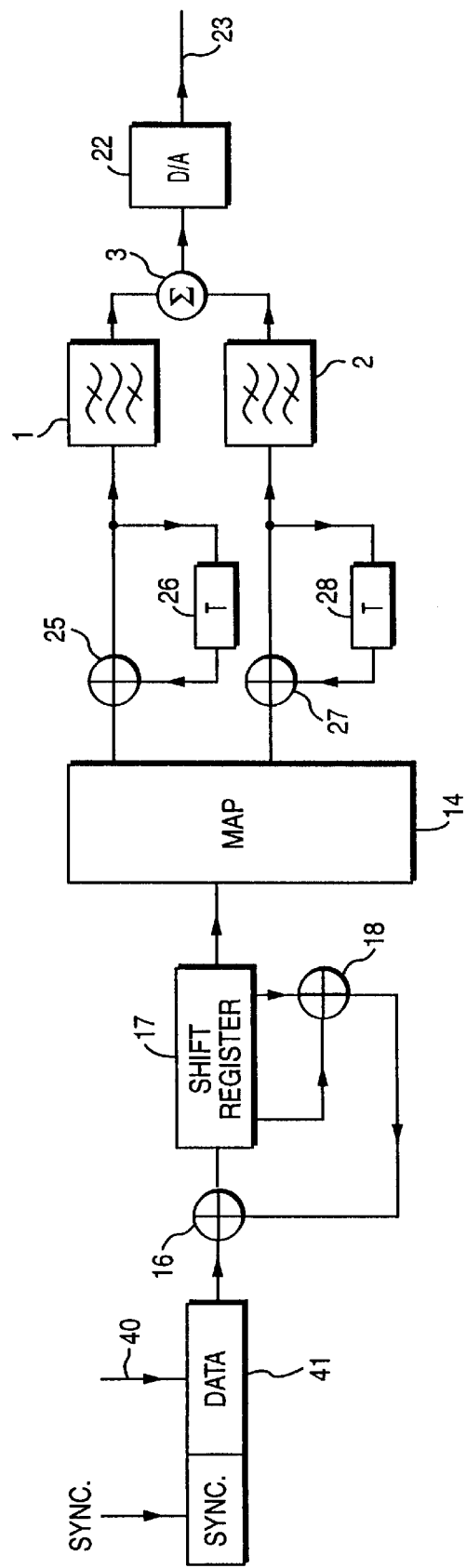
FIGS. 2 and 3 are block diagrams of respectively a transmitter and receiver embodying the invention.
Figure 3:
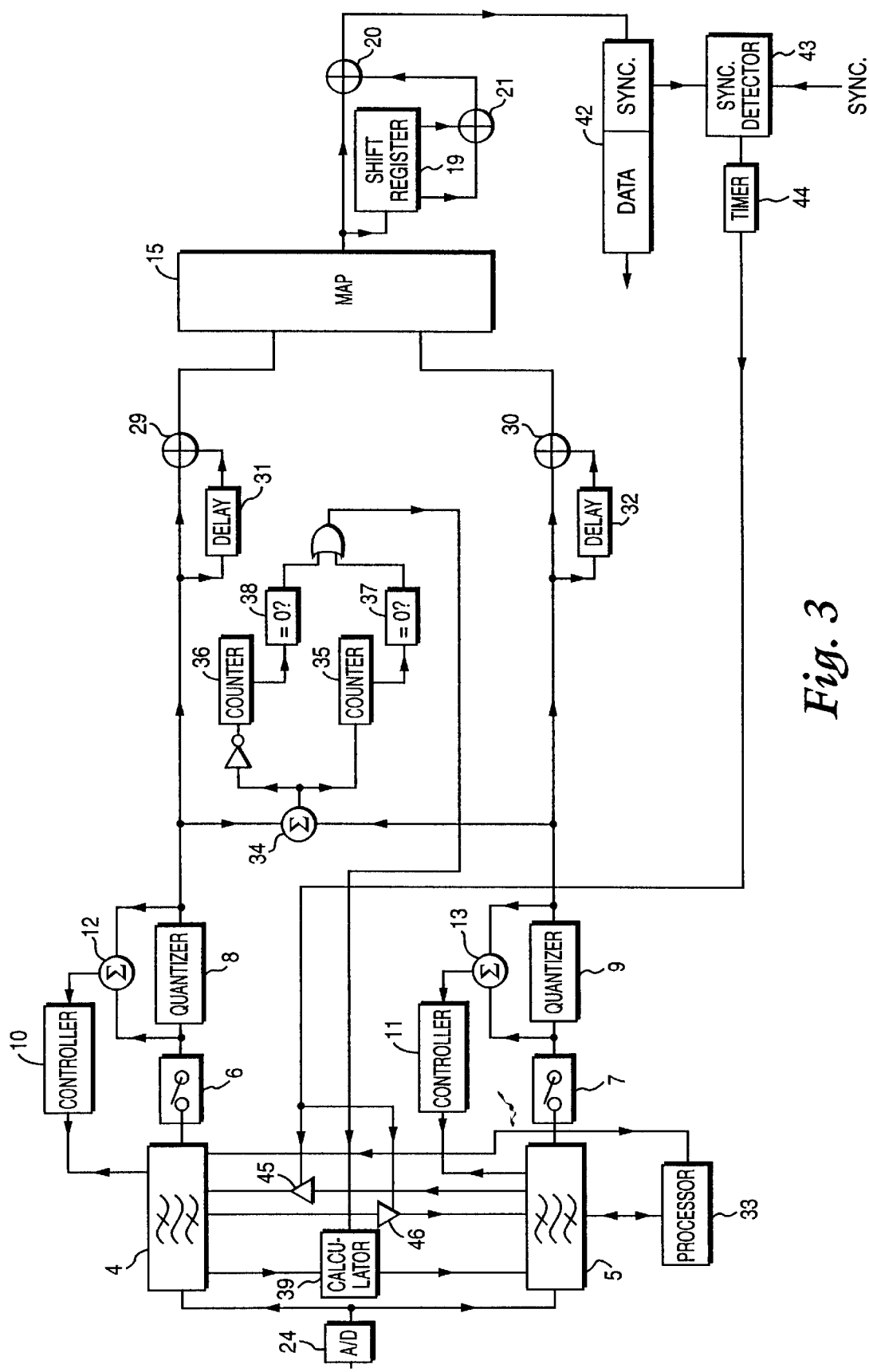

(3) the two filters 4, 5, may converge to the same response so that both channels produce (for example) signals $r_a(t)$ and the other signal sequence $r_b(t)$ is not recovered;

(4) the filters 4,5, converge to responses $G_b(t)$ and $G_a(t)$ respectively so that the channels are transposed;

FIGS. 2 and 3, depicting respectively a transmitter and a receiver, show an arrangement in which provision is made to alleviate these problems. Items 1 to 21 perform the same functions as in FIG. 1. It is assumed that all processing is performed digitally; thus, the transmitter has a digital-to-analogue converter 22 for transmission over an analogue line 23 and the receiver has an analogue-to-digital converter 24. In this example, a symbol rate of 6Msymbol/sec is assumed (i.e. T=167 ns), with each symbol carrying a single bit on each of its two channels—giving a bit rate of 6+2=12 Mbit/s. The output of filters 1, 2 and the inputs of filters 4, 5 operate at four times the bit rate, i.e. at 6+4=24 Msamples/s. The filters 1, 2 are typically digital transversal filters with 16 taps, and the filters 4, 5 with 32 taps. A typical resolution for the filters D/A and A/D converters might be 10 bits.

In order to avoid errors in the received signal due to convergence of the filter 4 and/or 5 to a response producing a negative output, differential coding is employed. Thus the input to the shaping filter 1 is obtained from the symbol mapper 14 via a differential coding arrangement comprising an exclusive-or gate 25 and a feedback delay line 26 of delay duration T, whilst a similar arrangement with an exclusive-or gate 27 and delay line 28 is provided at the input of the shaping filter 2. Note that the differential coding is applied only to the sign bit of the sample. The corresponding differential decoders at the receiver have exclusive-or gates 29, 30 and delay lines 31, 32.

The condition corresponding to an unwanted time-shift in one or both of the filters 4, 5 is recognised, and corrected, by the following steps:

(a) calculate the group delay $d_R$ of the filter 4;

(b) if the delay is less than 10 or greater than 14 taps, then shift the filter coefficients by an amount sufficient to correct this—i.e. a shift $k_R=4.\text{Round}[(d_R-d_D)/4]$, where "Round[x]" means "the nearest integer to x" and $d_D$ is the desired or target delay, typically 12 taps;

(c) calculate the group delay $d_Q$ of the filter 5;

(d) if the delay $d_Q$ is not within ±2 of the corrected delay $d_R$ of the filter 4, then shift the coefficients of the filter 5 by a shift $k_Q=4.\text{Round}[(d_Q-d_R)/4]$.

Of course, the group delay is not, in general, independent of frequency; in practice however it is found sufficient if the group delay is calculated at a frequency at or near the middle of the pass-band of the filter.

The calculation and shifting operation is shown in FIG. 3 as performed by a processing unit 33, connected to receive the filter coefficients $c_{Ri}$, $c_{Qi}$ (i=1 ... n where n is number of filter taps) from, and return them to, the filters 4,5. In practice it would be more convenient to employ a single digital signal processing device to perform not only this function but also the filtering, quantising and testing operations.

One possible algorithm for computing the group delay will now be described. The structure of the filter 4 or 5 is shown in FIG. 4 where we have a finite impulse response filter with delays 50, of duration T/4 supplying 32 delayed versions of input samples x, with multipliers 51 multiplying them by coefficients $c_i$, the products being added in an adder 52.

A good indicator of the signal delay can be calculated from the formal group delay $d(\omega)$ of the filter defined as:

$$d(\omega) = -\frac{\partial \Phi(\omega)}{\partial \omega} \tag{11}$$

where $\Phi(\omega)$ is the phase response of the filter.
According to accepted theory the transmission response $G(\omega)$ of a FIR filter is given by:

$$G(\omega) = \sum_{i=1}^{n} c_i z^i \tag{12}$$

where the $c_i$ are the coefficients in the figure and z represents the behaviour of a single delay element.

The delay z can alternatively be represented in terms of its real (in-phase) and imaginary (quadrature) response components to a sinusoidal stimulus at angular frequency $\omega$ as:

$$z = \cos(\omega) - j\sin(\omega) \tag{13}$$

Demoivre's rule then gives:

$$z^i = \cos(i\omega) - j\sin(i\omega) \tag{14}$$

This can be substituted into the expression for $G(\omega)$ giving:

$$G(\omega) = \sum_{i=1}^{n} c_i(\cos(i\omega) + j\sin(i\omega)) \tag{15}$$

The real and imaginary parts of this expression can then be separated:

$$G(\omega) = \sum_{i=1}^{n} c_i \cos(i\omega) + j \sum_{i=1}^{n} c_i \sin(i\omega) \tag{16}$$

And the phase response $\Phi(\omega)$ obtained as $\tan^{-1}$ (imaginary part/real part):

$$\Phi(\omega) = \tan^{-1}\left(\frac{\sum_{i=1}^{n} c_i \sin(i\omega)}{\sum_{i=1}^{n} c_i \cos(i\omega)}\right) \tag{17}$$

Differentiation of this expression using the function of a function and quotient rules is possible to obtain a closed form expression for the group delay of the filter:

$$d(\omega) = \frac{\sum_{i=1}^{n} c_i \sin(i\omega) \sum_{i=1}^{n} ic_i \sin(i\omega) + \sum_{i=1}^{n} c_i \cos(i\omega) \sum_{i=1}^{n} ic_i \cos(i\omega)}{\left(\sum_{i=1}^{n} c_i \sin(i\omega)\right)^2 + \left(\sum_{i=1}^{n} c_i \cos(i\omega)\right)^2} \tag{18}$$

This expression contains six sums of products, but only four of them are unique, which we will name $S0_n$, $S1_n$, $C0_n$ and $C1_n$:

$$S0_n = \sum_{i=1}^{n} c_i \sin(i\omega) \tag{19}$$

$$S1_n = \sum_{i=1}^{n} ic_i \sin(i\omega)$$

$$C0_n = \sum_{i=1}^{n} c_i \cos(i\omega)$$

$$C1_n = \sum_{i=1}^{n} ic_i \cos(i\omega)$$

The group delay can then be expressed as:

$$d(\omega) = \frac{N_n}{D_n} \tag{20}$$

where:

$$N_n = S0_n S1_n + C0_n C1_n$$

$$D_n = S0_n^2 + C0_n^2 \tag{21}$$

All the above allows the calculation of the filter delay as a function of frequency, $\omega$. For the purpose of deciding if the delay of a filter is "good" or "bad" or the delay of a pair of filters is "equal" or "unequal" it is desirable to reduce the metric of delay to a single number. There are many ways in which this can be done, taking the average over a range of frequencies, the rms value, the median or some other compromise. In practice it is often sufficient to evaluate the delay at a single point frequency somewhere near the middle of the filter passband. This could be any frequency, but in wideband applications a particularly convenient frequency will often be half the Nyquist frequency, i.e. $\omega = \pi/2$. To demonstrate the convenience of this we break the summations for S0, S1, C0 and C1 into subranges, substituting $\omega = \pi/2$:

$$S0_n = \sum_{i=0}^{n/4-1} \sum_{k=1}^{4} c_{4i+k} \sin((4i+k)\pi/2) \tag{22}$$

$$S1_n = \sum_{i=0}^{n/4-1} \sum_{k=1}^{4} (4i+k)c_{4i+k} \sin((4i+k)\pi/2)$$

$$C0_n = \sum_{i=0}^{n/4-1} \sum_{k=1}^{4} c_{4i+k} \cos((4i+k)\pi/2)$$

$$C1_n = \sum_{i=0}^{n/4-1} \sum_{k=1}^{4} (4i+k)c_{4i+k} \cos((4i+k)\pi/2)$$

In general this can only be done when n is a multiple of 4, but the same method can generally be used by fictitiously extending the coefficient set to the next multiple of 4 by supplying extra coefficients of value zero. The increments in the arguments of the trigonometric functions $2\pi i$ have no effect on their values so can be dropped. The remaining argument, $k\pi/2$, results in only two simple non-zero values under the inner summation, so the above expressions can be simplified:

$$S0_n = \sum_{i=0}^{n/4-1} c_{4i+1} - c_{4i+3} \tag{23}$$

$$S1_n = \sum_{i=0}^{n/4-1} (4i+1)c_{4i+1} - (4i+3)c_{4i+3}$$

-continued $$CO_n = \sum_{i=0}^{n/4-1} -c_{4i+2} + c_{4i+4}$$

$$C1_n = \sum_{i=0}^{n/4-1} -(4i+2)c_{4i+2} + (4i+4)c_{4i+4}$$

The above method of calculations reduces the problem to a few additions, four multiplications and one division, a calculation easily performed by most modern signal processing devices.

Below is a Fortran code fragment for making the delay calculation (where i is four times the index i used in equation 18):

```
s0 = 0 s1 = 0 c0 = 0 c1 = 0 do i = 0, n - 4, 4 s0 = s0      +          c(i + 1)  -           c(i + 3)
    s1 = s1  + (i + 1)*     c(i + 1)  - (i + 3)*  c(i + 3)
    c0 = c0  -              c(i + 2)  +           c(i + 4)
    c1 = c1  - (i + 2)*     c(i + 2)  + (i + 4)*  c(i + 4)

enddo del = (s0*s1 + c0*c1)/(s0*s0 + c0*c0)
```

In order to detect the condition that filters 4 and 5 have converged to similar or identical responses, a comparison is made between the outputs of the quantisers 8, 9 to determine whether the two symbol sequences output by the quantisers are identical. A second comparison is made to determine whether one is the complement of the other (implying that the two filters are substantially the same but differ in the sign of their coefficients). Necessarily of course the results of these comparisons are useful only after correction of any time shift.

Thus a comparator 34 compares the two' sequences bit by bit and if the two bits are different increments a counter 35, so that if the bits are continuously identical the counter remains at zero. Similarly if the two bits are the same a counter 36 is incremented, so that if the bits are continuously different the counter remains at zero. Detectors 37, 38 detect whether, after a period of 4 ms, either counter is at zero and if so initiate a process of downloading the coefficients from one filter (e.g., as shown, the filter 4), calculating the Hilbert transform of the coefficients and loading these into the filter 5 to replace its existing coefficients. This function is performed by a calculating unit 39, but could be incorporated into the unit 33. In this example each symbol carries only one bit per channel; if a group of bits is carried, then the comparator 34 will need to compare bit groups.

It would in fact be possible to dispense with the test and, upon start-up of the receiver and after convergence of the filter 4, to perform unconditionally this copying process. This is not the preferred method, since it would not permit recognition of misconvergence during subsequent operation; a periodic such transfer would solve this, but with the penalty that since, under practical conditions, a Hilbert transform copy of the other filter's coefficients is likely, due to imperfections in the system, to be non-optimum and therefore to result in a brief period of non-optimum operation while the filter reconverges. (If the margins built into a particular system are such that a copy is acceptable, one could of course perform this copy routinely and dispense altogether with the adaptation arrangements for the filter 5).

Detection of transposition of the channels is performed with the aid of a predetermined bit sequence included in the data. This will be referred to as a synchronising word on the basis that it can also be used for frame sychronisation, though this is, in the present context, incidental. Thus the transmitter of FIG. 2 receives input data at an input 40 and formats them into a data frame in a register 41 along with the synchronising word occupying the first 64 bits of a 1920-bit frame. The receiver of FIG. 3 reassembles the frame in a register 42 and a sync detector 43 compares, at instants determined by frame clock pulses synchronised (by conventional means, not shown) to this framing structure, the last 40 bits of the sync portion of the register contents (to allow ample time for synchronisation of the descramblers) with the predetermined bit sequence.

A timer 44 is reset each time the synchronising bits are recognised and produces a "sync fail" output if the synchronising bits are absent for a preset timeout period (e.g. 32 ms). If loss of synchronisation is recognised, this is assumed to indicate channel transposition and a process is initiated in which the coefficients of the filter 4 are copied across to the filter 5 and those of the filter 5 copied across to the filter 4. This is illustrated in FIG. 3 as performed by gates 45, 46.

These various monitoring and correction processes have been described as if they occurred continuously; in practice however they require digital computation and therefore occur cyclically. As briefly alluded to earlier, the processes of comparing results, and copying or recalculating filter coefficients—indeed the entire filtering and filter adaptation process—may be performed by a single digital signal processing device, suitably programmed. Typically such a device could perform such a cycle every 4 ms, which is found in practice to be more than adequate to achieve rapid convergence to normal operation following start-up or some disturbance.

Finally it should be noted that (unless shifted versions of the channels are also compared) checking for identity or similarity of channels must take place after the correction of relative time shifts in the filters 4 and 5 (it could also occur before, but would not provide meaningful results). Similarly, use of the "sync fail" signal to initiate transposition of filter responses must (subject to the same proviso) occur after any correction of identity or similarity of channels.

What is claimed is:

1. An apparatus for decoding carrierless phase/amplitude modulated signals, said apparatus comprising:

pair of adaptive filters arranged for separating two components of said signals; and differential decoding means adapted to receive each said component.

2. An apparatus for decoding carrierless phase/amplitude modulated signals, said apparatus comprising:

pair of adaptive filters for separating two components said signals, means for comparing the two components and means operable in the event of identity or similarity thereof to
   (a) calculate from the parameters of one filter of the pair the parameters of a filter having a response orthogonal to that of the one filter; and
   (b) replace the parameters of the other filter of the pair with the calculated parameters.

3. An apparatus for decoding carrierless phase/amplitude modulated signals, said apparatus comprising:

a pair of adaptive filters for separating two components said signals;

differential decoding means for each component;

means for comparing the two components; and means operable in the event of identity of similarity thereof to
   (a) calculate from the parameters of one filter of the pair the parameters of a filter having a response orthogonal to that of the one filter; and
   (b) replace the parameters of the other filter of the pair with the calculated parameters.

4. An apparatus for decoding carrierless phase/amplitude modulated signals, said apparatus comprising:

pair of adaptive filters for separating two components said signals;

means for measuring the relative delay introduced by the filters, and means for adjusting at least one of the filters so as to reduce the relative delay.

5. An apparatus according to claim 1, further including:

means for measuring the relative delay introduced by the filters, and means for adjusting at least one of the filters so as to reduce the relative delay.

6. An apparatus for decoding carrierless phase/amplitude modulated signals, said apparatus comprising:

pair of adaptive filters for separating two components said signals, means for detecting the presence of a predetermined signal sequence, and means operable in response to absence of such detection to exchange the responses of the two filters.

7. An apparatus for decoding carrierless phase/amplitude modulated signals, said apparatus comprising:

a pair of adaptive filters for separating two components said signals, different decoding means for each component, means for detecting the presence of a predetermined signal sequence, and means operable in response to absence of such detection to exchange the responses of the two filters.

8. An apparatus according to claim 6 including:

timer means operable to effect such exchange only in the event that the absence persits for a preset period.

* * * * *